United States Patent
Bingham et al.

(10) Patent No.: US 10,560,434 B2
(45) Date of Patent: Feb. 11, 2020

(54) AUTOMATED HONEYPOT PROVISIONING SYSTEM

(71) Applicant: Level 3 Communications, LLC, Broomfield, CO (US)

(72) Inventors: Skyler J. Bingham, Superior, CO (US); Mark R. Shirley, Louisville, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 191 days.

(21) Appl. No.: 15/428,977

(22) Filed: Feb. 9, 2017

(65) Prior Publication Data

US 2017/0230336 A1    Aug. 10, 2017

Related U.S. Application Data

(60) Provisional application No. 62/293,561, filed on Feb. 10, 2016.

(51) Int. Cl.
*H04L 29/06* (2006.01)

(52) U.S. Cl.
CPC ...... *H04L 63/0281* (2013.01); *H04L 63/1491* (2013.01); *H04L 63/1425* (2013.01)

(58) Field of Classification Search
CPC ............. H04L 63/0281; H04L 63/1491; H04L 63/1425
See application file for complete search history.

(56) References Cited

U.S. PATENT DOCUMENTS

| 80,208,868 | | 8/2008 | Hubbard |
| 8,856,869 B1 | | 10/2014 | Brinskelle |
| 2013/0152199 A1 | * | 6/2013 | Capalik ............... H04L 63/1441 726/23 |

OTHER PUBLICATIONS

International Preliminary Report on Patentability, dated Aug. 14, 2018, Int'l Appl. No. PCT/US17/017227, Int'l Filing Date Feb. 9, 2017; 7 pgs.
International Search Report dated Apr. 27, 2017, Int'l Appl. No. PCT/US17/017227, Int'l Filing Date Feb. 9, 2017; 3 pgs.
Written Opinion of the International Searching Authority dated Apr. 27, 2017, Int'l Appl. No. PCT/US17/017227, Int'l Filing Date Feb. 9, 2017; 5 pgs.

* cited by examiner

*Primary Examiner* — Chau Le
*Assistant Examiner* — Vance M Little

(57) ABSTRACT

Systems and methods for automatically provisioning honeynets are disclosed. The honeynets continuously gather and capture unauthorized network traffic and/or other information being transmitted, processed, accessed, and/or executed within the honeynet network that is indicative of a network threat or attack by unauthorized users.

21 Claims, 5 Drawing Sheets

AUTOMATED HONEYPOT PROVISIONING SYSTEM

CROSS REFERENCE TO RELATED APPLICATION

The present non-provisional application claims priority under 35 U.S.C. § 119 to U.S. Provisional Application No. 62/293,561 entitled "Automated Honeypot Provisioning System," filed on Feb. 10, 2016, and which is hereby incorporated by reference in its entirety.

TECHNICAL FIELD

Aspects of the present disclosure involve honeynet networks, and in particular, the automatic provisioning and configuration of honeynet networks and corresponding components.

BACKGROUND

Conventional security technologies used to monitor computing systems and/or computing networks, such as firewall or intrusion detection systems, typically generate massive amounts of data. To identify any attacks or unauthorized activity, a system administrator must sift through all of the data and validate that the data is identifying a meaningful and unauthorized attack, and/or interpret and prioritize the attack. Doing so is time-consuming, labor-intensive, and expensive. It is with these concepts in mind, among others, that various aspects of the present disclosure were conceived.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters may refer to the same parts throughout the different views. The drawings depict only typical embodiments of the present disclosure and, therefore, are not to be considered limiting in scope.

SUMMARY

Figure 1A:
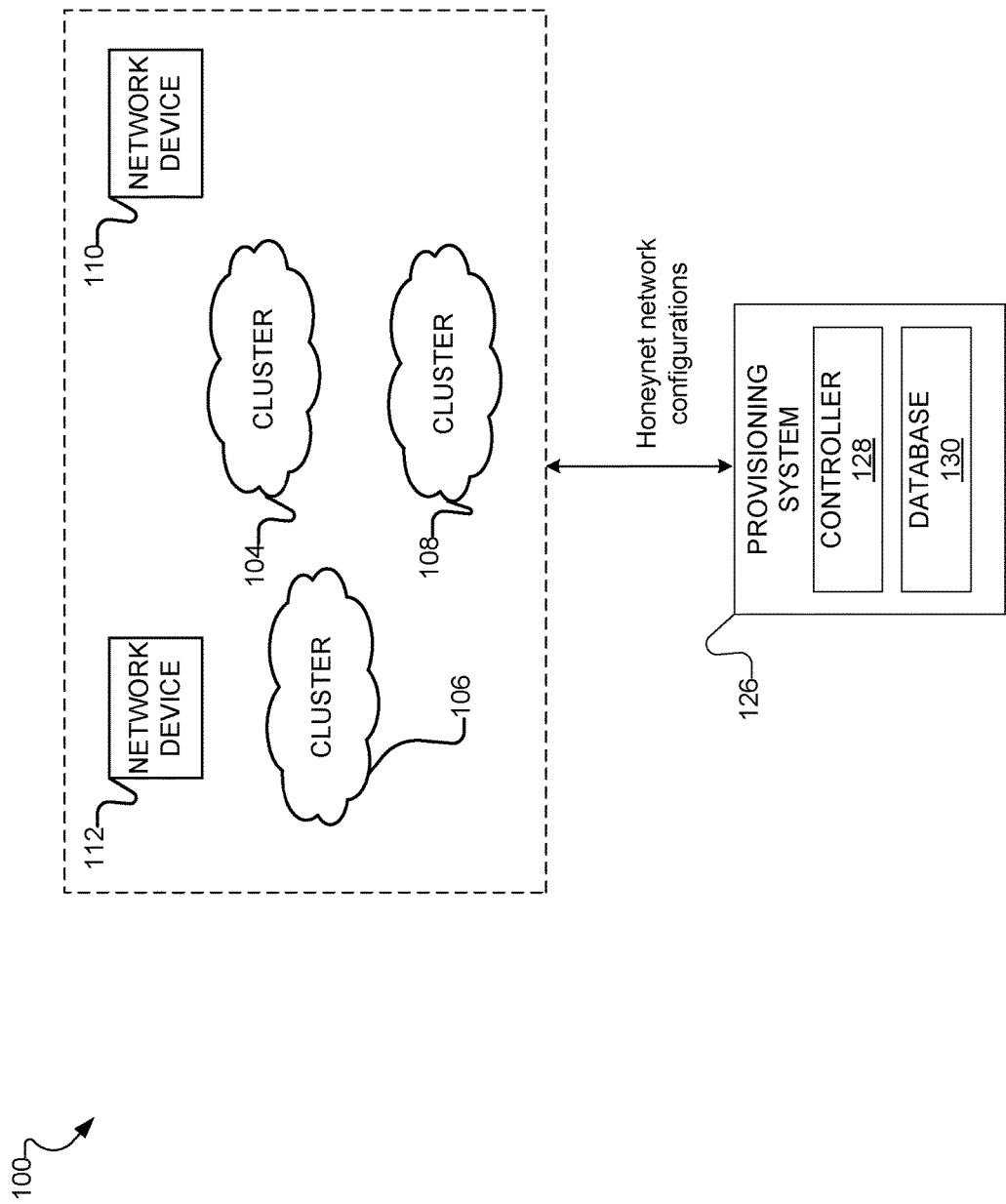
FIGS. 1A and 1B are block diagrams illustrating a honeynet network, according to aspects of the present disclosure.

Aspects of the present disclosure include systems, methods, and non-transitory computer readable mediums for detecting threats. The systems, methods, and non-transitory computer readable mediums include provisioning a honeynet network to monitor unauthorized network traffic attempting to access a service on at least one network device of a cluster of network devices deployed within a communications network. The honeynet network comprise at least one processing device, such as a honeycomb, for logging the unauthorized network traffic and at least one gateway device, such as a honeywall, for receiving the unauthorized traffic and generating a first set of logs corresponding to the unauthorized traffic. The honeynet network further comprises at least one honeypot to receive the unauthorized traffic from the gateway device, wherein the honeypot is an instance of the service, and wherein the honeypot monitors the unauthorized network traffic on the service and generates a second set of logs corresponding to the unauthorized traffic.

DETAILED DESCRIPTION

Aspects of the present disclosure involve systems and methods that automatically provision, configure, and operate a scalable and redundant software environment, referred to herein as a "honeynet" network environment that continuously gathers and captures (e.g., in real-time) data, network traffic, events, and/or other information being transmitted, processed, accessed, and/or executed within the honeynet network that is indicative of a network threat or attack by unauthorized users (e.g., an attacker).

Generally speaking, a honeynet represents a specific type of network that provides real, systems, applications, and/or services for attackers to interact with. The honeynet network is purposely established with intentional vulnerabilities that entice attackers into attempting to penetrate the honeynet network, thereby enabling the attacker's activities and methods to be captured, processed, and analyzed. For example, common vulnerabilities include missing patches and/or updates for various computing components, such as servers, that permit an unauthenticated command prompt or other backdoor path into the network. Other vulnerabilities include misconfigured firewall rule bases that allow for unauthorized access into the network. Vulnerabilities may include buffer overflows, which occurs when an application attempts to put more data in a buffer than it can hold. Writing outside the space assigned to the buffer allows an attacker to overwrite the content of adjacent memory blocks causing data corruption, crash the program, or the execution of an arbitrary malicious code. Other vulnerabilities may include faulty and/or buggy applications, such as e-mail clients, wherein arbitrary code may be executed, trojans implanted, etc.

Any data, network traffic, events, and/or other information captured by the honeynet may be integrated and visualized within various architectural components of the honeynet network. In other aspects, one or more interactive interfaces, graphical-user interfaces, dashboards and/or portals may be generated that enable users to access the captured data in the form of one or more analytics that identify and/or quantify potential security issues. Alternatively, the captured data, events, and/or other information may be securely transmitted back to a cluster of networking devices for automatic analysis.

The present application uses telecommunications networks and services as an example to illustrate the various embodiments of the concepts set out herein. The present application, however, is not limited to telecommunications services, and is applicable to other industries and services susceptible to network attack, denial-of-service attacks ("DOS attack"), distributed denial-of-service attacks ("DDOS attack"), exploitation of vulnerable network services, and/or the like.

FIG. 1A illustrates an example communications network 100 comprising various network devices 110-112 and one or more clusters 104, 106, and 108, some of which may be susceptible to attack by unauthorized users. The communications network 100 may be a telecommunications network, the Internet, an intranet, a local area network, a wireless local network, or any other type of communications network, as well as combinations of networks. The communications network 100 may be an IP-based telecommunications network, from a portion of the Internet, an intranet, a local area network, a wireless local network, a content distribution network, or any other type of communications network, as well as combinations of networks. For example, in one particular embodiment, the communications network 100 may be a telecommunications network including fiber-optic paths between various network elements, such as servers, switches, routers, boxes, and/or other optical telecommunications network devices that interconnect to enable receiving and transmitting of information between the various elements as well as users of the network. As used herein, a "box" refers to a physical unit/machine that includes one or more processors, disk drives, memory, controllers, etc., capable of executing one or more applications, such as servers, server applications, etc. A box may also be generally described as including both hardware and software components and generally described as a server. The communications network may also encompass a data center in which many such network devices reside.

Each of the clusters 104, 106, and/or 108 represents the logical orientation or arrangement of various computing resources and/or network devices, such as switches, routers, servers, etc., that share a common purpose, perform a certain function, and/or which may be executed together in some coordinated manner. For example, clusters of servers are often used in telecommunications to provide a specific service, such as content distribution and management. Common types of content distribution include standard caching, streaming, secure socket layer secured data transmission, and the like. Using a cluster to provide such services improves performance and availability over that of a single computing resource, such as a single server.

The network devices 110-112 and/or the clusters 104, 106, and/or 108 represent components of the communications network 100 that may be susceptible to attack(s) by unauthorized users, due to the sensitive data to which the components usually provide access. For example, in the telecommunications environment, such devices may include sensitive data and content (e.g., customer data), involving proprietary system configurations, and/or the like. To deter attacks from accessing the network devices and/or the clusters 104, 106, and/or 108 a honeynet may be deployed that emulates the functions of the various network devices 110-112 and/or the clusters 104, 106, and/or 108, Then, when an unauthorized user accesses the honeynet, the honeynet automatically captures extensive data and information about unauthorized attacks.

More specifically, a provisioning system 126, located within the communications network 100 and/or communicatively connected to the communications network 100 may include a controller 128 for provisioning and deploying a honeynet network within a network of existing hardware. The provisioning system 126 may further include a database 131 for storing and retrieving configuration files, any of which may be used to provision and/or otherwise configure a particular honeynet network. Although the database 130 of FIG. 1A is depicted as being located within the provisioning system 126, it is contemplated that the database 130 may be located external to the provisioning system 126, such as at a remote location, and may communicate with the provisioning system 126.

Figure 1B:
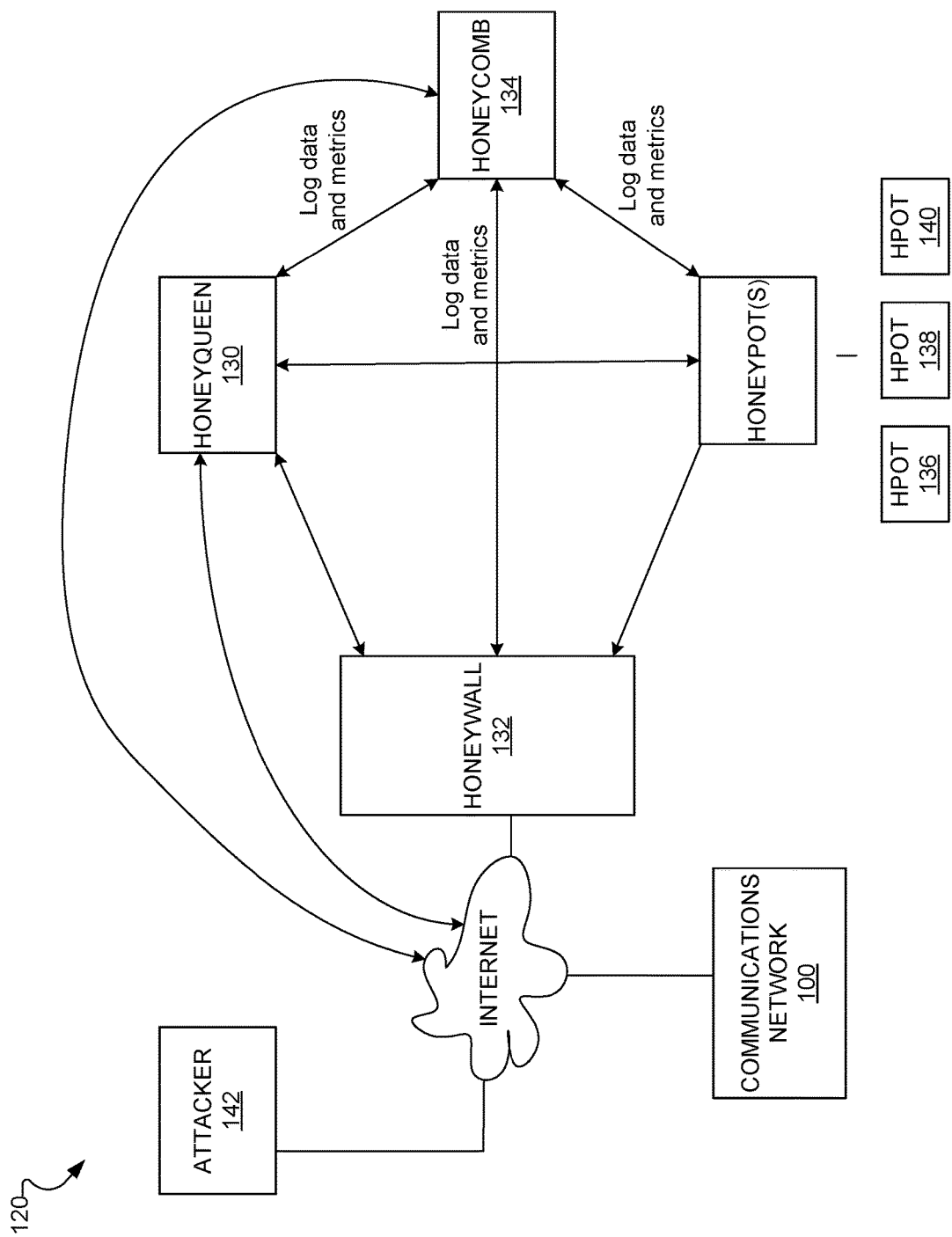

In various embodiments, the provisioning system 126 may receive a request to deploy a honeynet network, and in response, automatically provision a complete honeynet network. FIG. 1B provides an illustration of a honeynet network 120, according to one embodiment. As illustrated, the honeynet network 120 includes a honeyqueen server 130, a honeywall 132, a honeycomb 134 and one or more honeypots 136-140. Each component (e.g., honeyqueen, honeycomb, and one or more honeypots) may be assigned a role indicating how the respective component should function within the honeypot network 120.

Generally speaking, the honeyqueen server 130 represents a server device that controls and/or manages the honeynet network 120. More specifically, the honeyqueen server 130 logically communicates with the honeywall 132 and the one or more honeypots 136-140 to orchestrate and automate data collection and monitoring. Stated differently, the honeyqueen server 130, manages and monitors the data collected within the honeynet network 120 (e.g., at the honeywall 132 or the honeypots 136-140). For example, the honeyqueen server 130 may continuously extract or otherwise receive up-to-date data indicative of unauthorized traffic occurring at the honeypots 136-140 or the honeywall 132. Such data may provide enough information to identify the number of attackers, source and destination IP addresses, and source and destination ports, etc. In some embodiments, the honeyqueen server 130 may generate or otherwise serve a graphical-user interface that organizes the data to present a summary (e.g., a graph or chart) of the activity of the honeypots 136-140 or the honeywall 132.

The honeywall 132 represents a gateway device that separates the honeypots 136-140 from the rest of the network world of the communications network 100. Stated differently, the honeywall 132 is a network point that acts as an entrance and exit to the honeynet network 120, containing the honeypots 136-140. Thus, any network traffic attempting to gain access to the one or more the honeypots 136-140 (e.g., from an attacker 142) is routed through the honeywall 132 before contacting any of the honeypots 136-140.

Each honeypot 136-140 represents a type of computer security mechanism that is established to detect and/or otherwise deflect unauthorized use of the one or more clusters 104, 106, and 108. In one embodiment, each honeypot 136-140 may consist of a combination of data, software, services, and/or functionality that appears to be legitimate but which is actually isolated and monitored. Stated differently, each honeypot emulates the behavior of a given software, operating, system, and/or service, in the form of a decoy in one or more of the clusters 104, 106, and 108 and/or network devices 110-112. For example, a honeypot may include an operating system and corresponding software to implement and execute a seemingly legitimate web server. As another example, a honeypot may include software to simulate one or more network services that have been designated to a specific network port.

An attacker assumes the honeypot is running vulnerable services that may be used to exploit the various software and services running at the honeypot and sends unauthorized network traffic to the honeypot. The honeypots 136-140 monitor and capture, for real-time or later analysis, the unauthorized traffic and data sent from the attacker 142 to the honeypots 136-140. For example, the unauthorized traffic and data could be analyzed to identify early warning signs about future attacks and exploitations. The unauthorized traffic and data could be analyzed to identify unknown vulnerabilities existing within the software and/or hardware systems of the honeypots 136-140 that were unknown at deployment. The unauthorized traffic and data may include certain keystroke information and/or session signature information that may be used to detect vulnerabilities that are not yet understood. For example, a vulnerability and/or compromise may be detected by analyzing data leaving the honeypots 136-140 even if the means of the exploit has never been seen before.

The honeycomb 134 is a processing device that is responsible for transmitting the unauthorized network traffic captured at the honeypots 136-140 to the honeyqueen server 130 and/or the one or more of the clusters 104, 106, and 108 and/or the network devices 110-112 of the communications network 100 for processing and analysis. In one particular embodiment, the honeycomb 134 may include a message bus and a network file system that enables the honeycomb 134 to queue the captured unauthorized traffic in the message bus for transfer back to the cluster. Alternatively, unauthorized traffic may be stored as large binary files in the network file system for transfer back to the one or more of the clusters 104, 106, and 108 and/or the network devices 110-112.

Figure 3:
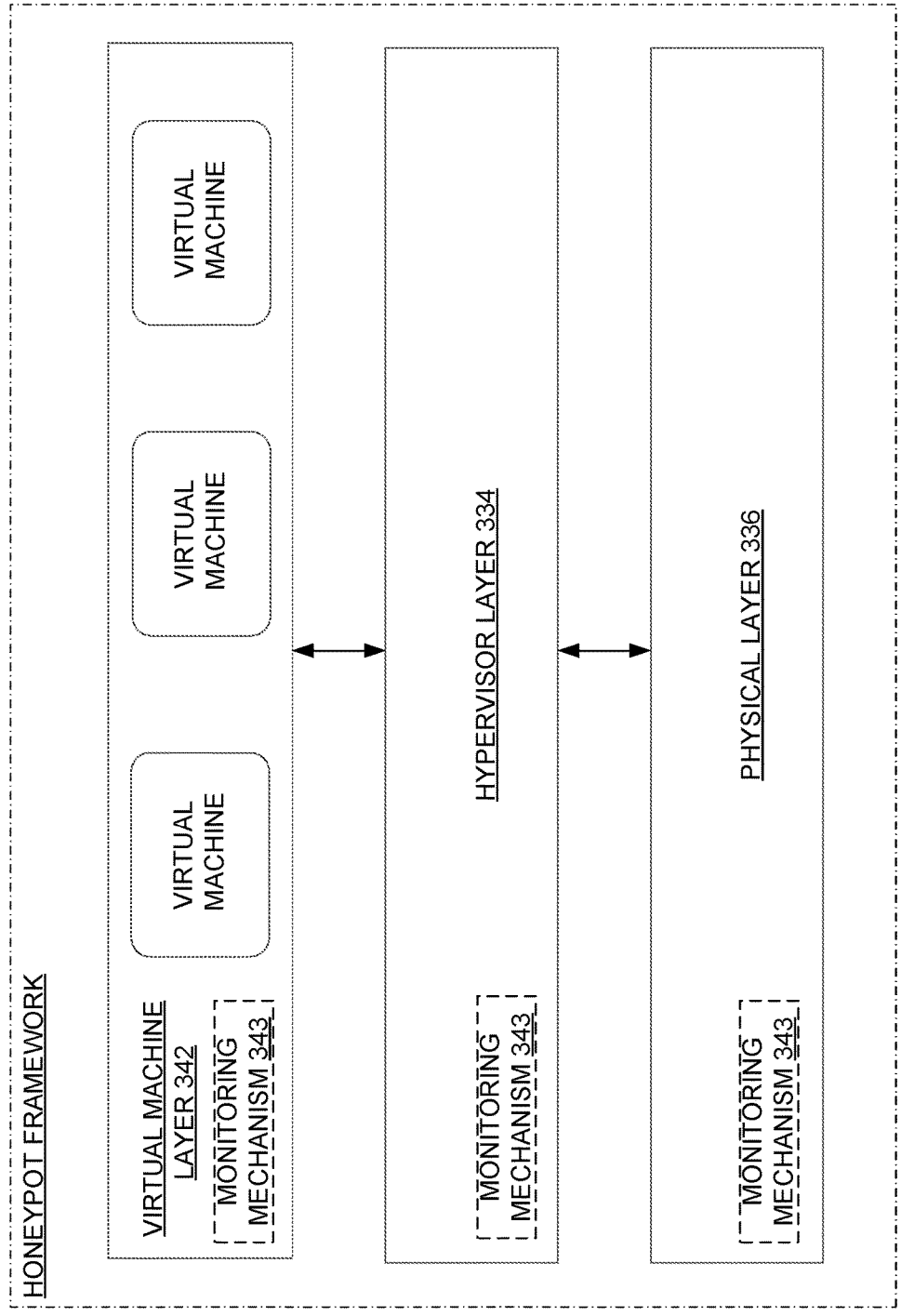
FIG. 3 is a diagram illustrating a honeypot, according to aspects of the present disclosure.

FIG. 3 provides an illustrative example of a honeypot 300, according to one embodiment. The illustrated embodiment depicts a virtual honeypot that simulates a virtual computing system at the network level. The honeypot appears to be a legitimate network component, and thus includes various computing layers and virtualizations similar to an actual network component, but all of which are isolated and monitored. Accordingly, in FIG. 3, the honeypot 300 is deployed within a virtualization environment capable of executing some type of useful application and/or service. Honeypot 300 includes configurable computing components and/or virtual machines at a virtual machine layer 342; a virtualization component 334, such as a hypervisor, to host virtual environments (e.g., virtual operating systems and applications), all of which communicates with some type of physical layer 336, such as a server. Each of the virtual machine layer 342, the virtualization component 334, and the physical layer 336, may be monitored by a monitoring mechanism 343 to capture unauthorized activity.

Figure 2:
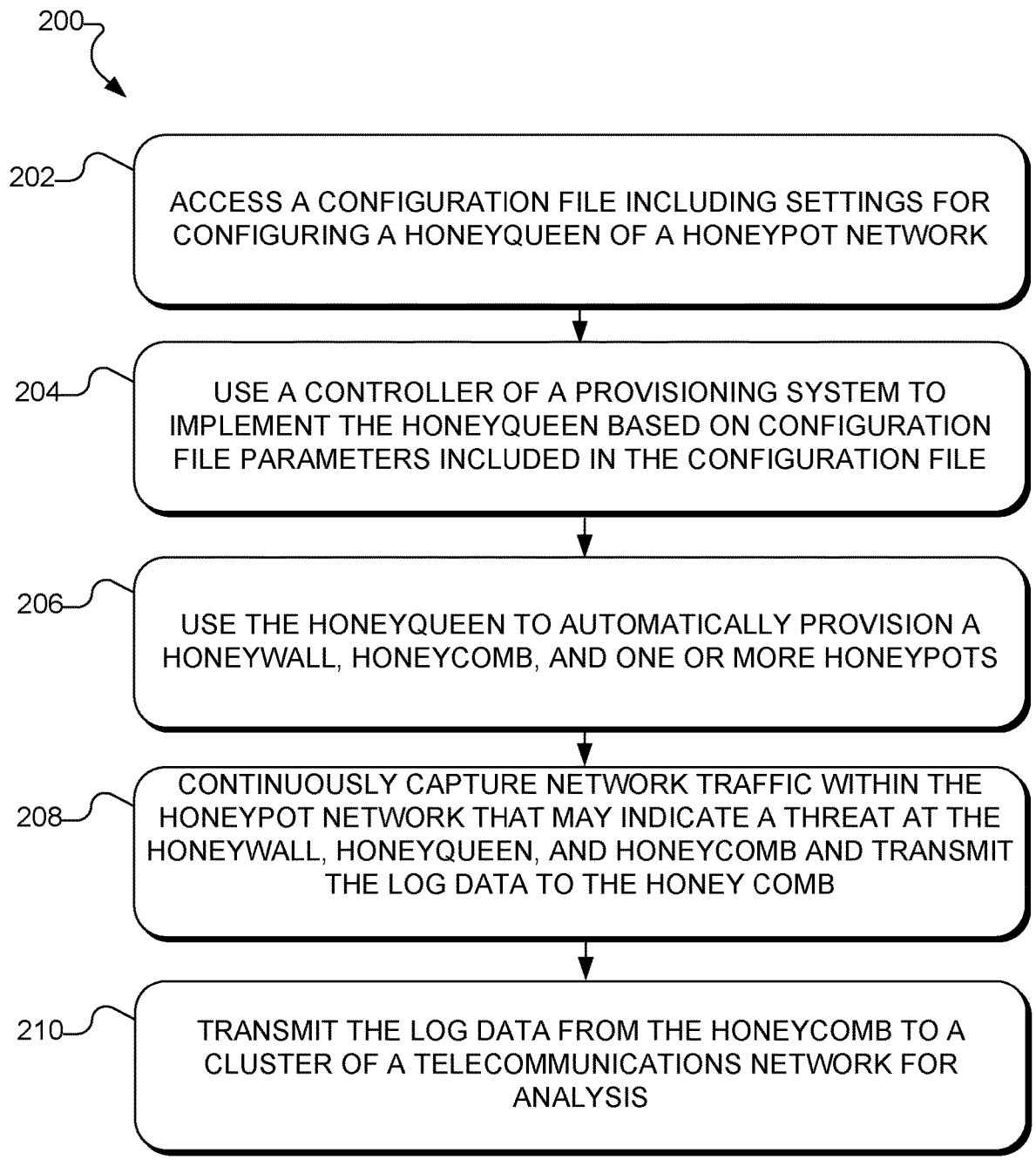
FIG. 2 is a flowchart illustrating an example process for automatically provisioning a honeynet network, according to aspects of the present disclosure.

Referring now to FIG. 2 and with general reference to FIGS. 1A and 1B, an illustrative process 200 for automatically provisioning and deploying a honeynet network is provided. As illustrated, process 200 begins with automatically provisioning a honeyqueen server based on provisioning data stored at the provisioning system that defines how to initialize and deploy components of a honeynet network (operation 202). Referring to FIG. 1A, the controller 128 of the provisioning system 126 automatically provisions a honeyqueen server, according to provisioning data stored at the provisioning system 126. For example, the provisioning data may include information to prepare the component (e.g., a server device) with appropriate systems, data, and software and make the component ready for network operation. The provisioning data may further define or otherwise include security mechanisms and corresponding security data that define the rights and privileges for access to the provisioned components. For example, the provisioning data may include at least one of application programming interface keys, secure shell keys, authentication parameters, and/or the like, any of which may be used to ensure any access to the provisioned component is in compliance with the defined access privileges. In one particular embodiment, the provisioning data may not be accessible by the provisioned honeynet network components, once the components have been deployed, so that in the event the honeynet network is subject to unauthorized traffic, the traffic cannot obtain or access the security definitions and mechanisms used to provision the honeynet network.

In addition to provisioning the honeyqueen, the provisioning system 126 may provision one or more honeywalls, honeycombs, and honeypots that should be included in the larger honeynet network based on the provisioning data (operation 204). For example, the provisioning data may be used to initialize physical hardware, operating systems, geographic locations, service roles, service configuration parameters, and/or the like, of the honeypots, honeycombs, and honeyqueens, etc.

Referring again to FIG. 2, once provisioned, the honeyqueen server and the other components of the honeynet network are configured according to configuration data that was obtained from the provisioning system during the provisioning of the honeyqueen server and other components of the honeynet network (operation 206). In one embodiment, the configuration data includes configuration parameters, such as the honeyqueen name, number and type of components (e.g., number of servers) network location (e.g., which network provider), among others. In another embodiment, the configuration data may include: 1) an application or service and/or otherwise identify an application or service for installation; and 2) one or more files containing instructions for how to specifically install the application or service on the honeyqueen server, or other component of the honeynet network. Stated differently, the configuration data may include specific parameters and initial settings for the application being installed on the honeyqueen server or other honeynet network component. In one particular embodiment, the configuration data may not be accessible by the provisioning system 126 that initially provisioned the honeyqueen. The configuration file may be generated prior to use and may be pre-stored in the database 131 of the provisioning system 126 and transmitted to the honeyqueen (or other honeynet network component) during provisioning. Alternatively, it is contemplated that users may interact with a user-interface generated by the provisioning system 126 to generate the configuration data and files and/or modify the configuration data and files. In one embodiment, once transmitted to the honeyqueen server and/or the other components of the honeynet network during provisioning, the configuration data may not be accessible by the provisioning system 126, so that in the event the honeynet network is subject to unauthorized traffic, the unauthorized traffic cannot obtain and use the configuration data to identify the provisioning system 126. In some embodiments, the Honeyqueen 130 may be used to manage the configuration of the other honeynet network components, including the honeycomb(s), honeypot(s), and/or honeywall(s). Stated differently, the honeypot(s), and/or honeywall(s) may access the honeyqueen server 130 to obtain updated configurations, new configurations, etc., but may not obtain any configuration data from the provisioning system 126.

The newly provisioned honeyqueen(s), honeypot(s), and/or honeywall(s) simultaneously, continuously, and/or automatically capture and log unauthorized network traffic and data within the honeypot network that may indicate a threat and transmit all of the logged network traffic data to the honeycomb (operation 208). In some embodiments, the logged data may include information that identifies (e.g., IP address) a machine, bot, botnet network, and/or other type of device associated with malicious behavior and information that outlines the attacker's actions, when interacting with various components of the honeynet network. In other embodiments, the captured unauthorized traffic and data may include information that is not available to other types of monitoring systems, such as Intrusion Detection Systems or firewalls. In one specific example, the various components of the honeynet, particularly the honeypots may log all connections, commands, downloaded files, and/or malware executed and/or otherwise performed at the various honeypots. For example, in instances where secure connections cannot easily be attacked (e.g., via man-in-the middle attacks), application level details may only be obtained at the honeypot level. In such instances, keystroke data for Secure Shell (SSH) connections and data sent via encrypted channels using custom encryption algorithms may be obtained by the honeypots.

The honeycomb (or other honeynet components) transmits the log data and other output to the various network devices 110-112 and/or the one or more clusters 104, 106, and 108 for notification, processing, and analysis (operation 210). In one embodiment, any of the logged events, and/or other information may be integrated and visualized within various architectural components of the honeynet network and/or transmitted back to the network devices 110-112 and/or the one or more clusters 104, 106, and 108 of the communications network 100. For example, the data may be visualized in-line with existing interfaces of architectural components of the communication network 100. In another embodiment, one or more interactive interfaces, graphical-user interfaces, dashboards and/or portals may be generated that enable users to access the logged data. In yet another embodiment, the data may be securely transmitted directly and automatically to the various network devices 110-112 and/or network clusters 104-108 for processing. While FIG. 1 illustrates clusters of telecommunication devices receiving the log data and other output, it is contemplated that such data may be provided to or otherwise received at any system capable of ingesting, processing, and analyzing the data.

In one embodiment, the identified threats may be prioritized as high, medium, or low, before being integrated with the existing architectural components, or being transmitted to the network devices 110-112 and/or network clusters 104-108 for processing. More specifically, as the data is captured, the data may be dynamically prioritized, as a result of the various components of the honeynet continually capturing unauthorized traffic. For example, if the same threat is detected or otherwise identified from the captured data, the threat may be prioritized as a high threat. The system may prioritize threats on a number of different factors including novelty of event, severity of event, correlation of specific event types, etc. For example, if a malware sample is downloaded, or an unknown attack is detected, the system may indicate that these threats at a higher priority. In other embodiments, the captured data may be processed to generate real-time security events and metrics by the clusters 104-108. For example, during the course of an attack, the honeypot(s) may be port-scanned and logged into using brute-force techniques that enable various commands to be executed, all of which will generate log data that maybe used to prioritize events.

Figure 4:
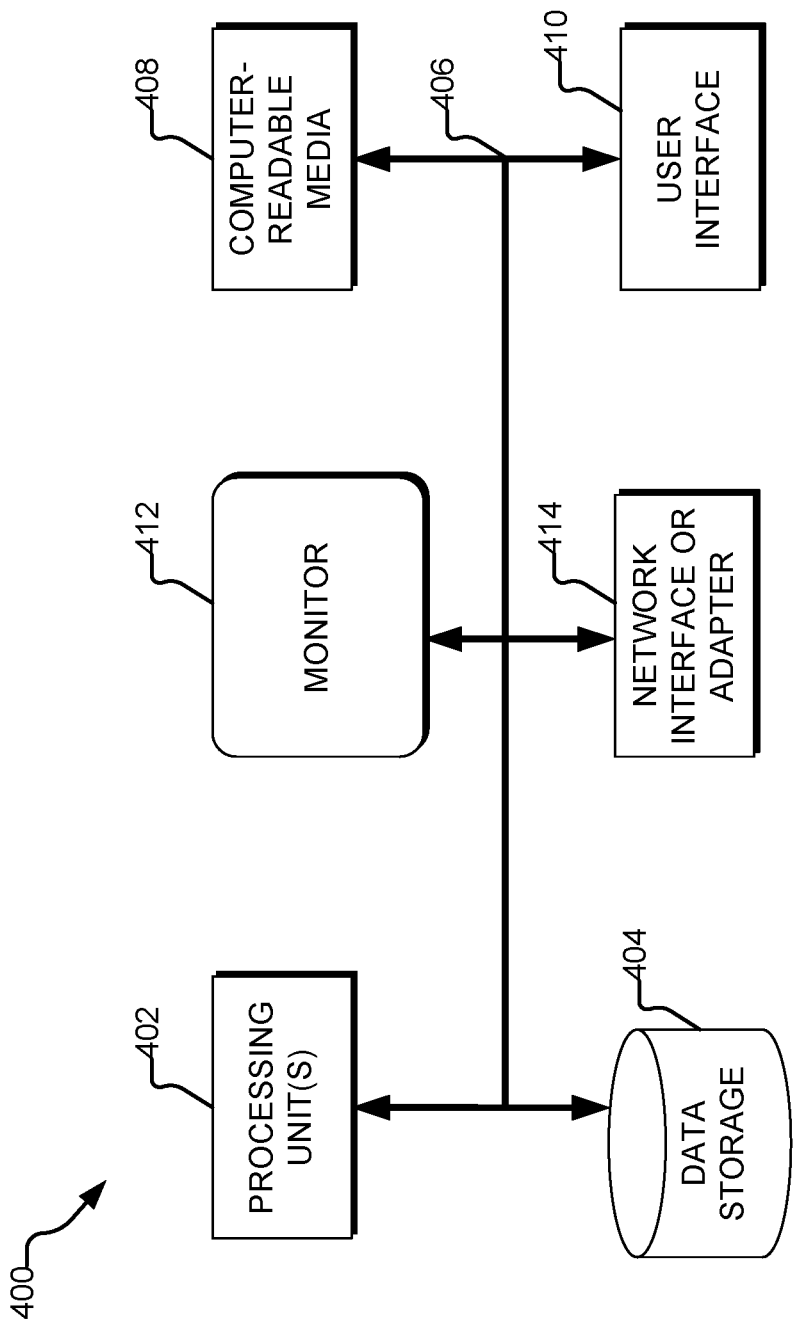
FIG. 4 is a block diagram illustrating a computing device automatically provisioning a honeynet network, according to aspects of the present disclosure.

FIG. 4 illustrates an example of a suitable computing and networking environment 400 that may be used to implement various aspects of the present disclosure described in FIG. 1-3. As illustrated, the computing and networking environment 400 includes a general purpose computing device 400, although it is contemplated that the networking environment 400 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 400. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media.

Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A system for detecting threats comprising:
a first server computing system included in a communications network, the first server computing system including at least one processor and a non-transitory computer readable medium storing instructions, when executed by the at least one processor cause the at least one processor to:
provision components for deployment as a honeynet network for the communications network, based on provisioning data stored at the first server computing system that is not accessible by the provisioned components once deployed as the honeynet network, the honeynet network to monitor unauthorized network traffic attempting to access a service executing within the honeynet network, the provisioned components of the honeynet network comprising:
a processing device to log the unauthorized network traffic;
a gateway device to receive a first portion of the unauthorized network traffic and generate a first set of logs corresponding to the unauthorized network traffic;
a honeypot to receive a second portion of the unauthorized network traffic, wherein the honeypot executes an instance of the service, and wherein the honeypot monitors the unauthorized network traffic of the service and generates a second set of logs corresponding to the monitored unauthorized network traffic; and
a second server computing system to automatically configure the gateway device, the processing device, and the honeypot based on configuration data stored at the second server computing device, wherein the configuration data is received from the first server computing system, and the configuration data is not accessible by the first server computing system following the provisioning of the components of the honeynet network.

2. The system of claim 1, wherein the provisioning data includes at least one of application programming interface keys, secure shell keys, and authentication parameters used during the provisioning of the processing device, the gateway device, the honeypot, and the second server computing system.

3. The system of claim 2, wherein the configuration data includes an application and one or more files defining instructions for installing the application and wherein automatically configuring the processing device, the gateway device, and the honeypot comprises:
installing the application on at least one of the processing device, the gateway device, and the honeypot based on the instructions for installing the application.

4. The system of claim 1, wherein the service emulates a behavior of an identical service executing on a network device of the communications network to attract the unauthorized network traffic to the honeynet network.

5. The system of claim 1, wherein the processing device is further configured to identify a threat from the unauthorized network traffic and prioritize the threat based on a number of times the threat is identified from the unauthorized network traffic.

6. The system of claim 1, wherein the processing device is further configured to provide access to the first set of logs and the second set of logs to at least one network device of the communications network.

7. The system of claim 1, wherein the honeynet network is separate and external to the communications network.

8. A method for detecting threats comprising:
provisioning, by a first server computing system, components for deployment as a honeynet network for a communications network based on provisioning data that is not accessible by the provisioned components once deployed as the honeynet network, the honeynet network to monitor unauthorized network traffic attempting to access a service on a network device of a cluster of network devices deployed within the communications network, the provisioning by the first server computing system including:
provisioning a processing device to log the unauthorized network traffic;
provisioning a gateway device to receive a first portion of the unauthorized network traffic and generate a first set of logs corresponding to the unauthorized network traffic;
provisioning a honeypot to receive a second portion of the unauthorized network traffic, wherein the honeypot executes an instance of the service, and wherein the honeypot monitors the unauthorized network traffic of the service and generates a second set of logs corresponding to the monitored unauthorized network traffic; and
provisioning a second server computing system to automatically configure the processing device, the gateway device, and the honeypot based on configuration data stored at the second server, wherein the configuration data is received from the first server computing system, and the configuration data is not accessible by the first server computing system following provisioning of the components.

9. The method of claim 8, wherein the provisioning data includes at least one of application programming interface keys, secure shell keys, and authentication parameters used during the provisioning of the processing device, the gateway device, the honeypot, and the second server computing system.

10. The method of claim 9, wherein the configuration data includes an application and one or more files defining instructions for installing the application and wherein automatically configuring the processing device, the gateway device, and the honeypot comprises:
installing the application on at least one of the processing device, the gateway device, and the honeypot based on the instructions for installing the application.

11. The method of claim 8, wherein the service emulates a behavior of an identical service executing on a network device of the communications network to attract the unauthorized network traffic to the honeynet network.

12. The method of claim 8, wherein the processing device is further configured to identify a threat from the unauthorized network traffic and prioritize the threat based on a number of times the threat is identified from the unauthorized network traffic.

13. The method of claim 8, wherein the processing device is further configured to provide access to the first set of logs and the second set of logs to at least one network device of the communications network.

14. The method of claim 8, wherein the honeynet network is separate and external to the communications network.

15. A non-transitory computer readable medium encoded with instructions for detecting threats, the instructions executable by a processor, comprising:
provisioning, by a first server computing system, components for deployment as a honeynet network for a communications network, based on provisioning data that is not accessible by the provisioned components, once deployed as the honeynet network, the honeynet network to monitor unauthorized network traffic attempting to access a service on a network device of a cluster of network devices deployed within the communications network, the provisioning by the first server computing system including:
provisioning a processing device to log the unauthorized network traffic;
provisioning a gateway device to receive a first portion of the unauthorized network traffic and generate a first set of logs corresponding to the unauthorized network traffic;
provisioning a honeypot to receive a second portion of the unauthorized network traffic, wherein the honeypot executes an instance of the service, and wherein the honeypot monitors the unauthorized network traffic of the service and generates a second set of logs corresponding to the monitored unauthorized network traffic; and
provisioning a second server computing system to automatically configure the processing device, the gateway device, and the honeypot based on configuration data stored at the second server, wherein the configuration data is received from the first server computing system, and the configuration data is not accessible by the first server computing system following provisioning of the components.

16. The non-transitory computer readable medium of claim 15, wherein the provisioning data includes at least one of application programming interface keys, secure shell keys, and authentication parameters used during the provisioning of the processing device, the gateway device, the honeypot, and the second server computing system.

17. The non-transitory computer readable medium of claim 16, wherein the configuration data includes an application and one or more files defining instructions for installing the application and wherein automatically configuring the processing device, the gateway device, and the honeypot comprises:
installing the application on at least one of the processing device, the gateway device, and the honeypot based on the instructions for installing the application.

18. The non-transitory computer readable medium of claim 15, wherein the service emulates a behavior of an identical service executing on a network device of the communications network to attract the unauthorized network traffic to the honeynet network.

19. The non-transitory computer readable medium of claim 15, wherein the processing device is further configured to identify a threat from the unauthorized network traffic and prioritize the threat based on a number of times the threat is identified from the unauthorized network traffic.

20. The non-transitory computer readable medium of claim 15, wherein the processing device is further configured to provide access to the first set of logs and the second set of logs to at least one network device of the communications network.

21. The non-transitory computer readable medium of claim 15, wherein the honeynet network is separate and external to the communications network.

* * * * *